UNITED STATES PATENT OFFICE.

VIGGO DREWSEN, OF BROOKLYN, NEW YORK, ASSIGNOR TO WEST VIRGINIA PULP & PAPER COMPANY, OF NEW YORK, N. Y., A CORPORATION OF DELAWARE.

CAUSTICIZED LIGNEOUS ACETATE MATERIAL AND PROCESS OF MAKING THE SAME.

1,298,480. Specification of Letters Patent. Patented Mar. 25, 1919.

No Drawing. Application filed July 23, 1918. Serial No. 246,331.

*To all whom it may concern:*

Be it known that I, VIGGO DREWSEN, a citizen of the United States, and resident of the borough of Brooklyn, county of Kings, city and State of New York, have made a certain new and useful Invention Relating to Causticized Ligneous Acetate Material and Processes of Making the Same, of which the following is a specification.

This application is a continuation in part of my co-pending applications Serial No. 811,141, filed January 9, 1914, and Serial No. 811,676, filed January 12, 1914, and contains subject-matter taken therefrom.

This invention relates especially to the treatment of soda waste liquor, known as black liquor, and which is formed when paper pulp is manufactured from deciduous or other woods by the caustic soda process, this black liquor being preferably first concentrated as by evaporation until it contains only about fifty per cent. or so of water. Additional caustic alkali such as caustic soda may also be advantageously incorporated with the concentrated waste liquor in some cases before the material is subjected to dry distillation, and if desired, such additional caustic soda to the extent of about fifteen to thirty per cent. or so of the weight of the organic matter present may be incorporated with the concentrated waste liquor; the mixture being preferably heated and boiled, at a temperature of about 125° centigrade for an hour or more, until more of the water is boiled off and the desired incorporation and conversion action takes place. The concentrated soda waste liquor, with or without the incorporation of such additional caustic alkali therewith, may be causticized by thoroughly incorporating therewith powdered quicklime to the extent of thirty-five to sixty per cent. or so of the weight of the concentrated waste soda liquor, with which it combines in connection with the slaking of the quicklime by the water present, part of which is thereby driven off. Causticized calcareous ligneous acetate material may thus be formed which is in permanently solid condition so as not to undesirably melt or foam under dry distilling conditions, and it may be in the form of a substantially dry powder or granulated material when about fifty per cent. of powdered quicklime is used. The causticized material may be subjected to distillation at high temperatures preferably with superheated steam and during the distillation is preferably gradually and uniformly heated while being agitated, which results in the recovery of large proportions of acetone, methyl alcohol and other valuable materials.

By this process large quantities of acetone and methyl alcohol together with some allied ketone volatile solvent material and still further quantities of oily distillates can be conveniently recovered from the waste liquor produced in the digestion of deciduous or other woods in the manufacture of wood pulp, etc., by the caustic soda process. Suitable black liquors or soda waste liquors are produced when poplar wood is used in the digesters or other deciduous woods, such as mixed deciduous woods, including poplar, sycamore and gum woods. The spent soda liquors from the digesters may be concentrated by evaporation in multiple effect evaporators until considerably concentrated as when the concentration is carried far enough to reduce the proportion of water in the material to about fifty per cent. or so. The usual black liquors preferably when concentrated to such thick syrupy consistency may be subjected to a supplemental converting process with additional caustic alkali, such as caustic soda to the extent of about fifteen to thirty per cent. of the weight of the organic matter present in the concentrated solution, twenty per cent. of caustic soda giving good results, the mixture to secure thorough incorporation being preferably heated or boiled under suitable pressure or even in some cases under a partial vacuum for a considerable time, the treatment extending about an hour or two in a digester or open evaporator in which the mixture is boiled at a temperature of about 120 to 140 degrees centigrade, but preferably at about 125 degrees centigrade. This heat conversion treatment may also effect elimination of still further proportions of water, when as is desirable the steam is allowed to escape.

The concentrated soda waste liquor with or without the incorporation of such additional caustic alkali therewith may advantageously be causticized by the incorporation of powdered quicklime to the extent of thirty-five to sixty per cent. or so of the weight of the concentrated soda waste liquor which may contain about fifty per cent. of water. On thoroughly incorporating therewith fifty per cent. for instance of powdered quicklime, which is considerably more than the amount of organic material present, the quicklime is slaked and seems to combine with the organic material, considerable water being driven off by the heat of slaking. The causticized material which may thus be formed, containing considerable acetate compounds, is permanently solid under dry distilling conditions so as not to undesirably melt or foam in the still and thus give trouble and prevent the uniform heating which is desirable in this connection. It is not, of course, necessary in all cases to incorporate as much as fifty per cent. of powdered quicklime with concentrated soda waste liquor containing about fifty per cent. of water, since the incorporation of thirty-five or forty per cent. or so of quicklime therewith gives a causticized material which can be largely or completely dehydrated in various ways and then remains permanently solid under destructive distillation. Furthermore, in some cases where the concentrated soda waste liquor originally contains less water the percentage of incorporated quicklime may be correspondingly still further reduced to some extent, although it is desirable to use, preferably substantially uniformly incorporated throughout the mass, not only ample quicklime or other alkali material to combine with the organic material before and during destructive distillation, but also to be capable of rendering the causticized material permanently solid under distilling conditions. The combined soda in this causticized calcareous ligneous acetate material may be largely or practically completely converted into the caustic soda form where fifty per cent. or so of quicklime is used and this has the additional advantage that when the carbonized distillation residue is leached the dissolved soda is substantially in the caustic condition desirable for wood pulp cooking liquors so that further causticizing is unnecessary. Where fifty per cent. or so of powdered quicklime is used the continued agitation or stirring of the mixture may eliminate sufficient water so that the causticized material is in finely granulated or substantially dry powdered form; and may contain some thirty-five to forty per cent. of lime on a calcium oxid basis, and some twenty to twenty-five per cent. of organic matter which is volatile at red heat, the total ash being some seventy to seventy-five per cent.

The granular or finely divided causticized material thus obtained may then be distilled in any suitable retort with superheated steam, for example, at 300 to 500 degrees centigrade or so and large quantities of acetone or methyl alcohol are thus secured, together with considerable additional amounts of black oily material. When treating black liquor produced when poplar wood is digested in the usual soda process of making wood pulp, yields of acetone and methyl alcohol have been secured as high as five to ten per cent. or more of the weight of the organic matter in the waste liquor, together with small quantities of allied volatile solvents, such as the higher ketone solvents, etc. There may also be secured in this distillation some three to ten per cent. of heavier oily solvent bodies which as a whole are lighter than water and which contain considerable water immiscible material. There is, of course, a large proportion of other more volatile material of a gaseous nature given off during the distillation and which is sufficiently inflammable so as to be used for retort heating and other heating purposes, if desired.

In some cases also sulfite waste liquors such as are produced in manufacturing wood pulp paper by the sulfite process, or the waste liquor secured after the utilization of such sulfite waste liquor for the production of grain alcohol by various processes, may be neutralized with suitable caustic alkali such as soda, lime, and so forth, which is preferably used in considerable excess, and this action which seems to convert the organic compounds is promoted by heating and agitation. It is sometimes desirable to take the sulfite waste liquor while still hot from the digester and run it into a suitable converter or digester containing an excess of caustic alkali, such as two to six per cent. or so of caustic soda, caustic lime, etc., which is allowed to react with the liquor at high temperatures for several hours, heat being supplied so as to keep the pressure up to 80 or 100 pounds more or less per square inch, while the mixture is agitated by the use of suitable stirrers in the digester or by using a rotary digester or converter to effect this agitation. Such caustic alkali treatment seems to convert the organic compounds in the sulfite liquor, the woody material being apparently converted into lignin or similar compounds which tend to precipitate and certain other organic components, such as some of the sugars or sugary materials, are apparently transformed into various lactonic acids or allied soluble compounds capable of being broken up or producing ketones and alcohols on dry distillation with steam under proper conditions. The converted mixture is preferably separated by filtration which may be more conveniently effected in some cases after carbon-dioxid has been percolated through the mixture, preferably under considerable pressure, which tends to promote the precipitation and aggregation of the particles of the lignin material which when separated by filtration usually represents some thirty per cent. or so of the dry weight of the organic matter in the original sulfite waste liquor.

The entire converted material, or preferably the filtrate secured from the original sulfite waste liquor after such conversion, may be concentrated to a thick syrupy consistency as by evaporation in suitable multiple effect evaporators, so that it contains some fifty per cent. of water or so; and may then be subjected to a further caustic alkali conversion by heating it with a large proportion of caustic soda or the like at ordinary or preferably high temperatures which seems to effect a further conversion or splitting up of some of the organic compounds possibly into simpler lactonic acids or allied products. Caustic soda to the extent of ten to fifty per cent. or so of the concentrated solution may be used for this alkali converting action and twenty per cent. or so of caustic soda is usually ample for the treatment of the concentrated filtrate remaining after the removal of the lignin from the original waste sulfite liquor from the digesters. The causticized mixture may be prepared for dry distillation and be rendered permanently solid under still conditions, and, if desired, be converted into a substantially dry or non-fluent condition, by the incorporation of powdered unslaked lime therewith in sufficient amounts to combine with the water present and drive off considerable quantities of the water by heat of slaking, so as to convert the causticized material into dry powdered form, if desired, when about an equal weight of the quicklime has been used. The granular or finely divided causticized calcareous ligneous acetate material or so-called calignate thus obtained may then be distilled in any suitable retort with superheated steam, for example, at 300 to 500 degrees centigrade or so and large quantities of acetone or methyl alcohol are thus secured, together with considerable additional amounts of black oily material.

In some cases it is possible to incorporate with or substitute for the previously mentioned soda waste liquor from the wood pulp digesters, more or less soda or other liquor produced by the digestion or partial solution for other purposes of wood or other generally similar vegetable fibrous material in caustic soda or other alkali; or if desired sawdust or other available woody or vegetable fiber material may be digested or dissolved to a suitable extent in caustic soda or other solutions and the resulting liquor, with or without the remaining insoluble organic material therein, may be subjected to such further alkali converting and causticizing treatment, including the incorporation of large amounts of quicklime therewith as to produce somewhat similar causticized calcareous ligneous acetate material. It is sometimes possible also to incorporate with the soda or other wood pulp waste liquor or the like, more or less additional woody or other generally similar vegetable matter or carbo-hydrate material, preferably in finely divided condition, before subjecting the liquor to the converting and causticizing actions described so that some additional amounts of acetone, etc., may be recovered during the dry distillation of the resulting causticized calcareous ligneous acetate material, which under still conditions should remain permanently solid and be free from foaming and irregular heating difficulties.

It is in some cases desirable that precautions be taken to minimize or prevent destructive or other undesirable oxidizing action on such calcareous ligneous acetate material as is formed from soda waste liquor, for instance, prior to and during the distilling thereof, and therefore to minimize its contact with air or other oxidizing medium, especially when the acetate material is substantially dry and hot. It is thus desirable, where the causticized ligneous acetate material contains no more than a few per cent. or so of moisture, to distil the same promptly after it is formed, or to store it in a neutral or substantially non-oxidizing atmosphere or at least out of undesirable contact with oxygen or other oxidizing material which might materially decrease the yield of acetone and the like. The products of the distillation of the converted causticized ligneous acetate material may be separated or fractionated in any suitable way so as to separate the more valuable volatile solvent materials from the other materials as by repeated distillation in a column still, for example, or in other ways. The distillation residue in the retort may, of course, be submitted to still higher heat and may be finally burned in the presence of air and the caustic or other valuable mineral matter may be separated as by leaching with hot water, for example, which dissolves the soda present and permits it to be recovered largely in the form of caustic soda with some little carbonate of soda while the remaining insoluble material may, if desired, be burned in a suitable kiln to recover the lime.

This invention has been described in connection with a number of illustrative apparatus, materials, proportions, arrangements, temperatures, pressures, times and orders of steps, to the details of which disclosure the invention is not of course to be limited, since what is claimed as new and what is desired to be secured by Letters Patent is set forth in the appended claims:

1. The granular causticized calcareous ligneous acetate material adapted for the production of acetone by dry distillation with steam and which when substantially dehydrated is permanently solid under dry distilling conditions so as not to undesirably melt or foam and which comprises acetate compounds and a large proportion of ligneous material from wood pulp waste liquor with which has been intimately incorporated quicklime to the extent of not less than about the dry weight of the organic material present.

2. The causticized calcareous ligneous acetate material adapted for the production of acetone by dry distillation with steam and which when substantially dehydrated is permanently solid under dry distilling conditions so as not to undesirably melt or foam and which comprises acetate compounds and a large proportion of ligneous material from wood waste liquor with which has been intimately incorporated quicklime to the extent of not less than about fifty per cent. of the dry weight of the organic material present.

3. The causticized calcareous ligneous acetate material adapted for the production of acetone by dry distillation with steam and which is permanently solid under dry distilling conditions so as not to undesirably melt or foam and which comprises acetate compounds from wood pulp waste liquor and a large proportion of ligneous material and intimately incorporated lime to the extent of not less than about fifty per cent. of the dry weight of the organic material present.

4. The calcareous ligneous acetate material adapted for the production of acetone by dry distillation with steam and which is permanently solid under dry distilling conditions so as not to undesirably melt or foam and which comprises acetate compounds and a large proportion of ligneous material and a large proportion of intimately incorporated lime.

5. The substantially dry calcareous ligneous acetate material adapted for the production of acetone by dry distillation and which is permanently solid under dry distilling conditions so as not to undesirably melt or foam and which contains at least forty per cent. of lime intimately incorporated with acetate compounds and with ligneous material.

6. The causticized calcareous ligneous acetate material adapted for the production of acetone by dry distillation and which is permanently solid under dry distilling conditions which contains at least forty per cent. of lime intimately incorporated with acetate compounds and with ligneous material from wood pulp waste liquor.

7. The calcareous ligneous acetate material adapted for the production of acetone by dry distillation which contains at least forty per cent. of lime intimately incorporated with acetate compounds and with ligneous material.

8. The calcareous organic acetate material adapted for the production of acetone by dry distillation and which is permanently solid under dry distilling conditions so as not to undesirably melt or foam and which contains a considerable proportion of lime intimately incorporated with acetate compounds and with large proportions of organic vegetable material.

9. The acetate material adapted for the production of acetone by dry distillation and which when substantially dehydrated is permanently solid under dry distilling conditions so as not to undesirably melt or foam and which contains a considerable proportion of alkaline material intimately incorporated with acetate compounds and with large proportions of organic vegetable material.

10. The process of treating the waste liquor produced in the manufacture of wood pulp by the caustic soda process to form therefrom acetate material adapted for the production of acetone and allied volatile solvent material by dry distilling with steam, which comprises evaporating the waste liquor to produce concentrated material containing only about fifty per cent. of water, and incorporating and combining therewith finely divided quicklime to the extent of about thirty-five to sixty per cent. of such concentrated material and eliminating water therefrom to produce calcareous ligneous acetate material which when substantially dehydrated is permanently solid under dry distilling conditions.

11. The process of treating the waste liquor produced in the manufacture of wood pulp by the caustic soda process to form therefrom acetate material adapted for the production of acetone and allied volatile solvent material by dry distilling with steam, which comprises evaporating the waste liquor to produce concentrated material containing only about fifty per cent. of water, and incorporating and combining therewith quicklime to the extent of about fifty per cent. of such concentrated material and eliminating water therefrom to produce substantially dry calcareous ligneous acetate material which is permanently solid under dry distilling conditions.

12. The process of treating the waste liquor produced in the manufacture of wood pulp to form therefrom acetate material adapted for the production of acetone and allied volatile solvent material by dry distilling with steam, which comprises concentrating the waste liquor and incorporating and combining therewith additional caustic soda to the extent of more than twenty per cent. of the organic matter present to produce concentrated causticized material containing only about fifty per cent. of water, and incorporating and combining therewith quicklime to the extent of about thirty-five to sixty per cent. of such concentrated material and eliminating water therefrom to produce substantially dry granular calcareous ligneous acetate material which is permanently solid under dry distilling conditions.

13. The process of treating the waste liquor produced in the manufacture of wood pulp to form therefrom acetate material adapted for the production of acetone and allied volatile solvent material by dry distilling with steam, which comprises concentrating the waste liquor and incorporating and combining therewith additional caustic soda to the extent of more than twenty per cent. of the organic matter present to produce concentrated causticized material, and incorporating and combining therewith quicklime and eliminating water therefrom to produce substantially dry calcareous ligneous acetate material which is permanently solid under dry distilling conditions.

14. The process of treating the waste liquor produced in the manufacture of wood pulp to form therefrom acetate material adapted for the production of acetone and allied volatile solvent material by dry distilling with steam, which comprises concentrating the waste liquor and incorporating and combining therewith additional caustic alkali material to produce concentrated causticized material, and incorporating and combining therewith quicklime and eliminating water therefrom to produce calcareous ligneous acetate material which when substantially dehydrated is permanently solid under dry distilling conditions.

15. The process of treating the waste liquor produced in the manufacture of wood pulp to form therefrom acetate material adapted for the production of acetone and allied volatile solvent material by dry distilling with steam, which comprises concentrating the waste liquor and incorporating and combining therewith alkali material to produce concentrated causticized material, and intimately incorporating and combining therewith quicklime to the extent of about sixty to one hundred per cent. of the solid components of such concentrated material and eliminating water therefrom to produce calcareous ligneous acetate material which when substantially dehydrated is permanently solid under dry distilling conditions.

16. The process of treating the waste liquor produced in the manufacture of wood pulp to form therefrom acetate material adapted for the production of acetone and allied volatile solvent material by dry distilling with steam, which comprises concentrating the waste liquor and incorporating and combining therewith caustic soda to produce concentrated causticized material, and incorporating and combining therewith quicklime to the extent of over fifty per cent. of the solid components of such concentrated material and eliminating water therefrom to produce calcareous acetate material.

17. The process of treating the waste liquor produced in the manufacture of wood pulp by the caustic soda process to form therefrom acetate material adapted for the production of acetone and allied volatile solvent material by dry distilling with steam, which comprises concentrating the waste liquor to produce concentrated material, and incorporating and combining therewith quicklime to at least the extent of about sixty to one hundred per cent. of the solid components of such concentrated material and eliminating water therefrom to produce calcareous ligneous acetate material which when substantially dehydrated is permanently solid under dry distilling conditions.

18. The process of treating the waste liquor produced in the manufacture of wood pulp by the caustic soda process to form therefrom acetate material adapted for the production of acetone and allied volatile solvent material by dry distilling with steam, which comprises concentrating the waste liqur to produce concentrated material, and incorporating and combining therewith quicklime to the extent of over about eighty per cent. of the solid components of such concentrated material and eliminating water therefrom to produce substantially dry calcareous ligneous acetate material which when substantially dehydrated is permanently solid under dry distilling conditions.

19. The process of treating the waste liquor produced in the manufacture of wood pulp by the caustic soda process to form therefrom acetate material adapted for the production of acetone and allied volatile solvent material by dry distilling with steam, which comprises concentrating the waste liquor and incorporating therewith additional caustic soda to the extent of about fifteen to thirty per cent. of the organic matter present to produce concentrated material, and incorporating and combining therewith powdered quicklime to an amount at least about equal in weight to the organic matter present and eliminating water therefrom to produce substantially dry calcareous ligneous acetate material which is permanently solid under dry distilling conditions.

20. The process of treating the waste liquor produced in the manufacture of wood pulp by the caustic soda process to form therefrom acetate material adapted for the production of acetone and allied volatile solvent material by dry distilling with steam, which comprises concentrating the waste liquor and incorporating therewith additional caustic soda to produce concentrated material, and intimately incorporating and combining therewith quicklime to an amount at least about equal in weight to the organic matter present and eliminating water therefrom to produce substantially dry calcareous ligneous acetate material which is permanently solid under dry distilling conditions.

21. The process of treating the waste liquor produced in the digestion of woody or vegetable material by the caustic soda process to form therefrom acetate material adapted for the production of acetone and allied volatile solvent material by dry distilling with steam, which comprises concentrating the waste liquor containing dissolved ligneous material to produce concentrated material, and incorporating and combining therewith quicklime to an amount at least about equal in weight to the organic matter present and eliminating water therefrom to produce calcareous ligneous acetate material which is permanently solid under dry distilling conditions.

22. The process of treating soda liquor containing large proportions of incorporated dissolved woody or vegetable material to form therefrom acetate material adapted for the production of acetone and allied volatile solvent material by dry distilling with steam, which comprises concentrating the liquor and intimately incorporating and combining therewith alkaline material comprising quicklime to an amount at least about equal in weight to the organic matter present and eliminating water therefrom to produce calcareous ligneous acetate material which is permanently solid under dry distilling conditions.

23. The process of treating liquor containing considerable incorporated and dissolved woody or vegetable material to form therefrom acetate material adapted for the production of acetone and allied volatile solvent material by dry distilling with steam, which comprises concentrating the liquor and treating the same with caustic alkali and intimately incorporating and combining therewith alkaline material comprising quicklime to an amount at least about equal in weight to the organic matter present and eliminating water therefrom to produce calcareous ligneous acetate material which is permanently solid under dry distilling conditions.

24. The process of treating the waste liquor produced in the manufacture of wood pulp by the caustic soda process to form therefrom acetate material adapted for the production of acetone and allied volatile solvent material by dry distilling with steam, which comprises concentrating the waste liquor and intimately incorporating and combining therewith alkaline material comprising quicklime to an amount at least about equal in weight to the organic matter present and eliminating water therefrom to produce calcareous ligneous acetate material which is permanently solid under dry distilling conditions.

25. The process of treating the waste liquor produced in the manufacture of wood pulp to form therefrom acetate material adapted for the production of acetone and allied volatile solvent material by dry distilling with steam which comprises concentrating the waste liquor and intimately incorporating and combining therewith caustic alkaline material comprising quicklime to an amount at least about equal in weight to the organic matter present and eliminating water therefrom to produce calcareous ligneous acetate material which is permanently solid under dry distilling conditions.

VIGGO DREWSEN.